United States Patent
Yamasaki et al.

(10) Patent No.: US 10,144,374 B2
(45) Date of Patent: Dec. 4, 2018

(54) AUTOMATIC SETTINGS FOR VEHICLE COMPONENTS BASED ON MEASURED ANTHROPOMETRIC FEATURES

(71) Applicant: Toyota Motor Engineering & Manufacturing North America, Inc., Erlanger, KY (US)

(72) Inventors: Bryan E. Yamasaki, Ypsilanti, MI (US); Sean L. Helm, Saline, MI (US); Eric R. Schmidt, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 108 days.

(21) Appl. No.: 14/886,300

(22) Filed: Oct. 19, 2015

(65) Prior Publication Data
US 2017/0106875 A1    Apr. 20, 2017

(51) Int. Cl.
| | | |
|---|---|---|
| *B60R 16/037* | (2006.01) | |
| *B60W 50/08* | (2012.01) | |
| *B60R 25/00* | (2013.01) | |
| *B60R 25/10* | (2013.01) | |

(52) U.S. Cl.
CPC ............ *B60R 16/037* (2013.01); *B60R 25/00* (2013.01); *B60R 25/10* (2013.01); *B60W 50/08* (2013.01)

(58) Field of Classification Search
CPC .......... B60R 25/10; B60R 16/37; B60R 25/00
USPC ...................... 701/1, 33.4; 707/769; 348/148
See application file for complete search history.

(56) References Cited

U.S. PATENT DOCUMENTS

| | | | | |
|---|---|---|---|---|
| 5,748,473 A | * | 5/1998 | Breed | B60N 2/002 |
| | | | | 180/273 |
| 6,724,920 B1 | * | 4/2004 | Berenz | G06K 9/00221 |
| | | | | 180/169 |
| 8,935,052 B2 | * | 1/2015 | Hermann | B60R 25/20 |
| | | | | 701/302 |

(Continued)

OTHER PUBLICATIONS

An eigenface approach for estimating driver pose; P. Watta; N. Gandhi; S. Lakshmanan; ITSC2000. 2000 IEEE Intelligent Transportation Systems. Proceedings (Cat. No. 00TH8493); Year: 2000; pp. 376-381, DOI: 10.1109/ITSC.2000.881091.*

(Continued)

*Primary Examiner* — Cuong H Nguyen
(74) *Attorney, Agent, or Firm* — Christopher G. Darrow; Darrow Mustafa PC

(57) ABSTRACT

A vehicle can be configured to automatically provide settings for one or more components of the vehicle based on a measured anthropometric feature of a person approaching the vehicle. The vehicle can include a sensor configured to acquire data (e.g., visual data) of a portion of an external environment of the vehicle. The external environment can include a person approaching the vehicle. The vehicle can include a component that can be adjustable across a plurality of settings. The component can have a current setting. A processor can be operatively connected to the sensor and the component. The acquired data can be analyzed to measure an anthropometric feature of the person approaching the vehicle. A target setting of the component can be determined based on the measured anthropometric feature. The current setting of the component can be caused to match the determined target setting.

21 Claims, 5 Drawing Sheets

(56) References Cited

U.S. PATENT DOCUMENTS

| | | | | |
|---|---|---|---|---|
| 9,378,601 B2* | 6/2016 | Ricci | ............... | B60Q 1/00 |
| 2003/0059124 A1* | 3/2003 | Center, Jr. | ......... | G06K 9/00234 |
| | | | | 382/278 |
| 2006/0082439 A1* | 4/2006 | Bazakos | ............ | G06K 9/00228 |
| | | | | 340/5.82 |
| 2007/0192038 A1* | 8/2007 | Kameyama | ........ | G01C 21/3641 |
| | | | | 702/19 |
| 2011/0218709 A1* | 9/2011 | Hermann | ................ | B60R 25/20 |
| | | | | 701/45 |
| 2013/0249669 A1* | 9/2013 | Zwiener | .............. | B60R 25/2045 |
| | | | | 340/5.53 |
| 2014/0309806 A1* | 10/2014 | Ricci | ................ | B60Q 1/00 |
| | | | | 701/1 |

OTHER PUBLICATIONS

An optical flow based approach for action recognition; Upal Mahbub; Hafiz Imtiaz; Md. Atiqur Rahman Ahad; 14th International Conference on Computer and Information Technology (ICCIT 2011); Year: 2011; pp. 646-651, DOI: 10.1109/ICCITechn.2011.6164868.*
An optical flow based approach for action recognition; Jake T. Lussier; Sebastian Thrun; 2014 IEEE/RSJ International Conference on Intelligent Robots and Systems; Year: 2014; pp. 451-458, DOI: 10.1109/IROS.2014.6942598.*
Autoinfotainment Security Development Framework ASDF for Smart Cars; Pratik Satam et al.; 2017 Inter. Conf. on Coud and Autonomic Computing, 2017, pp. 153-159.*
Know your master driver profiling based anti-theft method; Byung Il Kwak et al., 2016 14th Annual Conference on Privacy, Security and Trust (PST); year: 2016; pp. 211-218; IEEE.*

* cited by examiner

AUTOMATIC SETTINGS FOR VEHICLE COMPONENTS BASED ON MEASURED ANTHROPOMETRIC FEATURES

FIELD

The present disclosure relates generally to vehicles and, more particularly, to vehicles with one or more adjustable vehicle components.

BACKGROUND

Vehicles commonly include one or more components that are adjustable by a user. Examples of such components include vehicle seats, steering wheels, and side mirrors. In some instances, a user must manually adjust the component to a desired setting. Some vehicles can be configured to enable a user to define one or more preferred settings for the component. For instance, a user can define a preferred seat position. In some instances, such preferred settings can be stored for later recall. When the setting is subsequently recalled by a user, the vehicle component can be automatically adjusted to the user-defined preferred setting.

SUMMARY

In one respect, the present disclosure is directed to a system for automatically providing a setting for one or more components of a vehicle. A sensor can be configured to acquire sensor data (e.g., visual data) of a portion of an external environment of the vehicle including a person approaching the vehicle. A component of the vehicle can be adjustable across a plurality of settings, and the component can have a current setting. A processor can be operatively connected to the sensor and the component. The processor can be programmed to initiate executable operations. The executable operations can include analyzing the sensor data acquired to measure an anthropometric feature of the person approaching the vehicle. The executable operations can include determining a target setting for the component based on the measured anthropometric feature. The executable operations can include causing the current setting of the component to match the target setting.

In another respect, the present disclosure is directed to a method of automatically providing a setting for one or more components of a vehicle. The method can include acquiring data (e.g., visual data) of a portion of an external environment of the vehicle including a person approaching the vehicle. The method can include measuring an anthropometric feature on the person approaching the vehicle. The method can include determining a target setting for a component of the vehicle based on the measured anthropometric feature. The component can be adjustable across a plurality of settings. The component can have a current setting. The method can include causing the current setting of the component to match the target setting.

DETAILED DESCRIPTION

Figure 1:
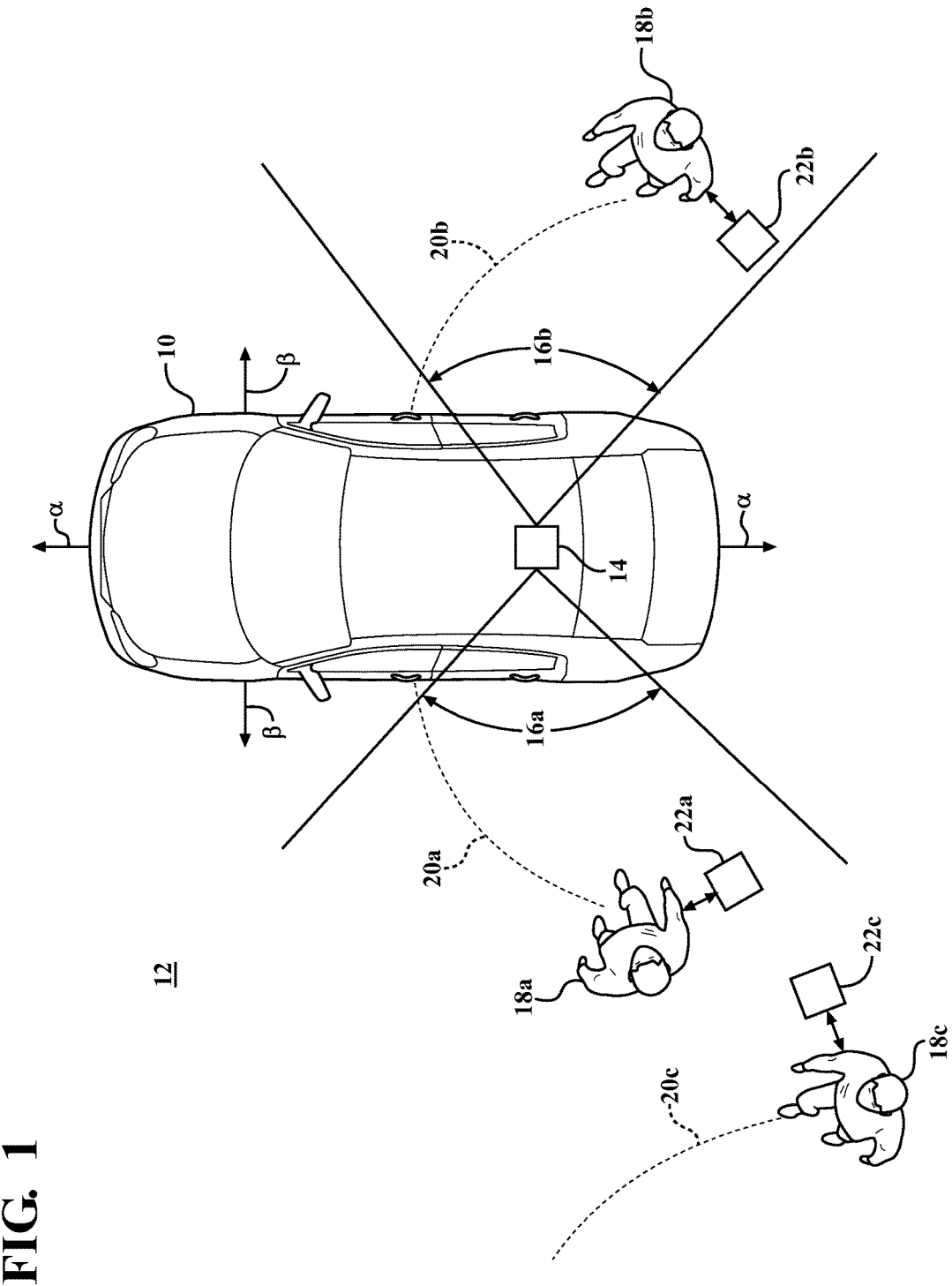
FIG. 1 is an example of a system for automatically providing a setting for one or more components of a vehicle, showing a plurality of persons in an external environment of the vehicle.

This detailed description relates to automatically providing settings for one or more components of a vehicle. Sensor data of a portion of an external environment of the vehicle can be acquired. In one or more arrangements, the sensor data can be visual data. The sensor data can be analyzed. If the sensor data includes a person approaching the vehicle, an anthropometric feature of the person can be measured. A target setting for an adjustable vehicle component can be determined based on the measured anthropometric feature. A current setting of the component can be caused to match the determined target setting. Arrangements described herein can, for example, provide convenience and/or comfort to one or more occupants of the vehicle.

Detailed examples are disclosed herein; however, it is to be understood that the disclosed examples are intended only to facilitate the description. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-5, but the examples are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the examples described herein can be practiced without these specific details.

Referring now to FIG. 1, an example of a system for automatically providing a setting for one or more components of a vehicle is shown. The system can include a vehicle 10. The vehicle 10 can be any suitable type of vehicle. As used herein, "vehicle" means any form of transport that is at least partially motorized. In one or more implementations, the vehicle 10 can be an automobile. While arrangements will be described herein with respect to automobiles, it will be understood that embodiments are not limited to automobiles. In one or more implementations, the vehicle 10 can be a watercraft, an aircraft, a space craft, a golf cart, a motorcycle, and/or any other form of transport that is at least partially motorized.

The vehicle 10 can be located in any location. The vehicle 10 can have an associated external environment 12. "External environment" means the surroundings of the vehicle or any portion(s) thereof. One or more objects can be located in the external environment 12. For instance, one or more persons 18a, 18b, 18c can be located in the external environment 12. There can be any number of persons located in the external environment 12, and the number of persons can change at any time. While three persons 18a, 18b, 18c located in the external environment 12 at the moment in time shown in FIG. 1, it will be understood that arrangements described herein are not limited in this respect. Indeed, in some instances, there can be greater than three persons, or, in other instances, there can be fewer than three persons located in the external environment 12. In some instances, there may be no persons located in the external environment 12.

In some instances, one or more of the persons 18a, 18b, 18c can have an associated mobile device 22a, 22b, 22c. As used herein, "mobile device" means any device that is at least partially electronic and is readily movable by a human being. "Associated mobile device" is a mobile device that is carried by, worn by, supported on, held by, attached to, and/or otherwise traveling with a person. In one or more arrangements, one or more of the mobile devices 22a, 22b, 22c can associated with the vehicle 10. Non-limiting examples of the mobile device include a key fob, a smart phone, a cell phone, a wearable device, or the like. While FIG. 1 shows a scenario in which each of the persons 18a, 18b, 18c has an associated mobile device 22a, 22b, 22c, respectively, it will be understood that arrangements herein are not limited in this respect. Indeed, in some instances, one or more of the persons 18a, 18b, 18c may not have an associated mobile device. Further, in some instances, none of the persons may have an associated mobile device.

As will be described herein, the vehicle 10 can be configured to acquire visual data of one or more of at least a portion of the external environment 12. The visual data can include one or more of the persons located in the external environment 12. Thus, in the example of FIG. 1, the visual data can include one or more of the persons 18a, 18b, 18c. The vehicle 10 can be configured to measure one or more anthropometric features of the person approaching the vehicle 10. The vehicle 10 can be configured to determine a target setting of an adjustable component can be determined based at least partially on the measured anthropometric feature. A current setting of the adjustable component can be caused to match the determined target setting.

Figure 2:
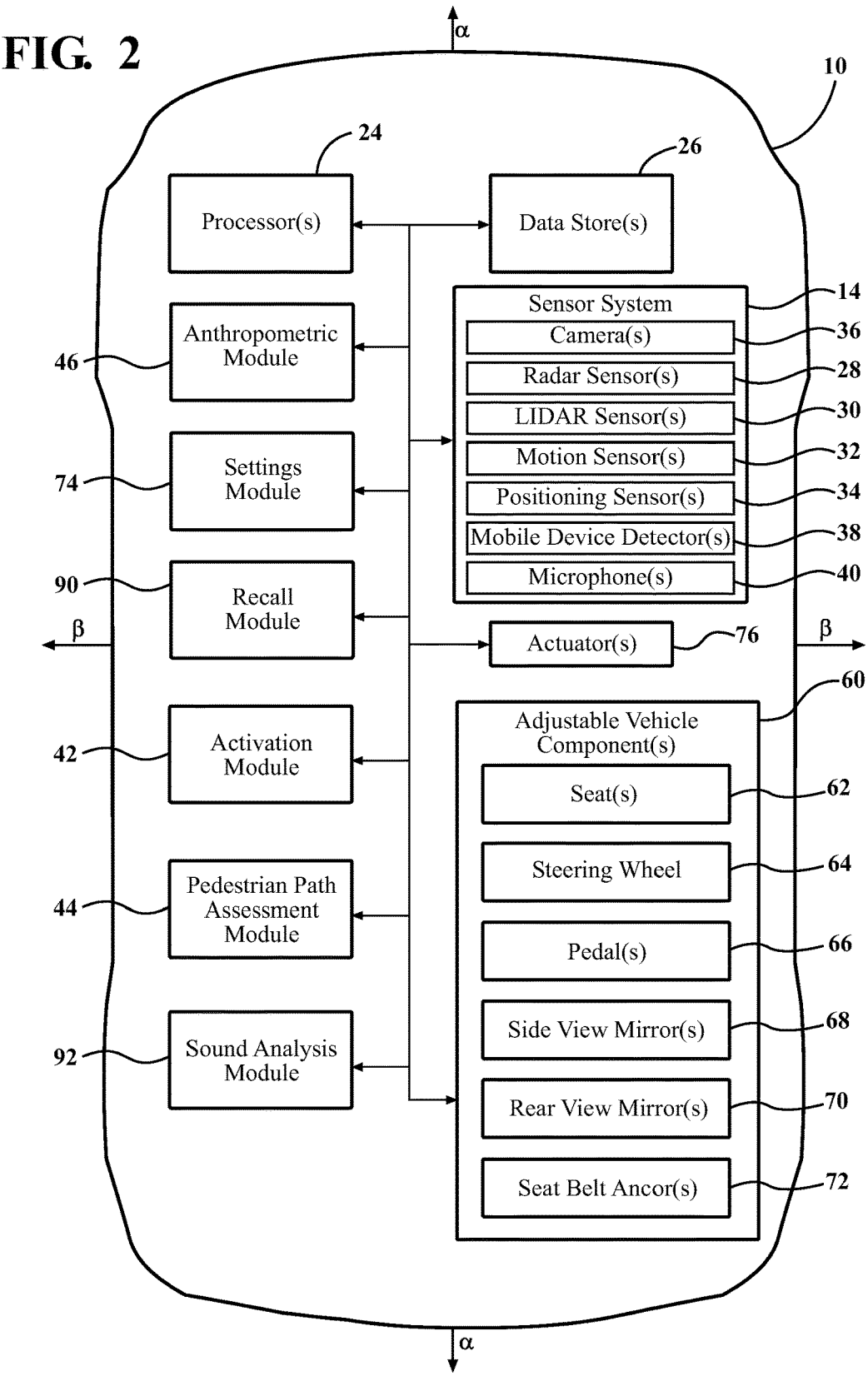
FIG. 2 is an example of a vehicle configured to automatically provide a setting for one or more components of a vehicle.

Referring now to FIG. 2, an example of the vehicle 10 is shown. The vehicle 10 can include various elements. Some of the possible elements of the vehicle 10 are shown in FIG. 2 and will now be described. It will be understood that it is not necessary for the vehicle 10 to have all of the elements shown in FIG. 2 or described herein. The vehicle 10 can have any combination of the various elements shown in FIG. 2. Further, the vehicle 10 can have additional elements to those shown in FIG. 2. In some arrangements, vehicle 10 may not include one or more of the elements shown in FIG. 2. Further, while the various elements are shown as being located within the vehicle 10 in FIG. 2, it will be understood that one or more of these elements can be located external to the vehicle 10. Further, the elements shown may be physically separated by large distances.

The vehicle 10 can include one or more processors 24. "Processor" means any component or group of components that are configured to execute any of the processes described herein or any form of instructions to carry out such processes or cause such processes to be performed. The processor(s) 24 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 24 can include at least one hardware circuit (e.g., an integrated circuit) configured to carry out instructions contained in program code. In arrangements in which there is a plurality of processors 24, such processors can work independently from each other or one or more processors can work in combination with each other. In one or more arrangements, the processor 24 can be a main processor of the vehicle 10. For instance, the processor 24 can be an electronic control unit (ECU).

The vehicle 10 can include one or more data stores 26 for storing one or more types of data. The data store(s) 26 can include volatile and/or non-volatile memory. Examples of suitable data store(s) 26 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 26 can be a component of the processor(s) 24, or the data store(s) 26 can be operatively connected to the processor(s) 24 for use thereby. The term "operatively connected," as used throughout this description, can include direct or indirect connections, including connections without direct physical contact.

The vehicle 10 can also include a sensor system 14. The sensor system 14 can include be one or more sensors. "Sensor" means any device, component, and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process. Although the sensor system 14 is shown in FIG. 1 as being in one location of the vehicle 10, it should be noted that the sensor system 14 can be positioned anywhere in or on the vehicle 10. The sensor system 14 can be at least partially include existing systems of the vehicle 10, such as backup sensors, lane keeping sensors, and/or front sensors, just to name a few possibilities.

In arrangements in which the sensor system 14 includes a plurality of sensors, the plurality of sensors can be distributed about the vehicle 10 in any suitable manner. In arrangements in which the sensor system 14 includes a plurality of sensors, the sensors can work independently from each other. Alternatively, two or more of the sensors can work in combination with each other. In such case, the two or more sensors can form a sensor network.

The sensor system 14 can include any suitable type of sensor. For example, the sensor system 14 can include one or more sensors configured to detect, determine, assess, monitor, measure, quantify and/or sense information about the external environment 12 in which the vehicle 10 is located. For example, the sensor system 14 can be configured to detect, determine, assess, monitor, measure, quantify and/or sense objects in at least a portion of the external environment of the vehicle 10 and/or information/data about such objects. Such objects may be stationary objects and/or dynamic objects. Alternatively or in addition, the sensor system 14 can include one or more sensors configured to detect, determine, assess, monitor, measure, quantify and/or sense the location of the vehicle 10 and/or the location of objects in the external environment 12 relative to the vehicle 10. Alternatively or in addition, the sensor system 14 can include one or more sensors configured to detect, determine, assess, monitor, measure, quantify, classify, identify, and/or sense the movement of objects in the external environment 12 of the vehicle 10. Various examples of these and other types of sensors will be described herein. It will be understood that the examples are not limited to the particular sensors described. The sensor system 14 can be operatively connected to the processor(s) 24, the data store 26, and/or any other components, elements, and/or modules of the vehicle 10.

The sensor system 14 can include one or more sensors configured to sense the external environment 12 of the vehicle 10 or portions thereof. For instance, the sensor system 14 can be configured to acquire data of at least a forward portion and/or at least a rearward portion of the external environment 12 of the vehicle 10. "Forward portion" means a portion of the external environment that is located forward of the vehicle. For example, the sensor system 14 can monitor the forward portion along the longitudinal direction α of the vehicle 10. "Rearward portion" means a portion of the external environment that is located behind the vehicle. For example, the sensor system 14 can monitor the rearward portion along a longitudinal direction α of the vehicle 10.

Additionally or alternatively, the sensor system 14 can be configured to acquire data of at least a side portion of the external environment 12 of the vehicle 10. "Side portion" means a portion of the external environment that is located lateral to the vehicle relative to the longitudinal direction of the vehicle. For example, the sensor system 14 can be configured to monitor a left side portion 16a (see, e.g., FIG. 1) and/or a right side portion 16b (see, e.g., FIG. 1). As another example, the sensor system 14 can be configured to monitor a left side and/or a right side portion along a lateral direction β of the vehicle 10. Various examples of possible sensors of the sensor system 14 will be described herein. However, it will be understood that the embodiments are not limited to the particular sensors described.

In one or more arrangements, the sensor system 14 can include one or more cameras 36. "Camera" is defined as any device, component, and/or system that can capture visual data. "Visual data" includes video and/or image information/data. The visual data can be in any suitable form. In one or more arrangements, visual data can include heat signatures, thermal images, and/or thermal video of a portion of the external environment 12 of the vehicle 10.

The camera(s) 36 can be any suitable type of camera. For instance, the one or more cameras 36 can be high resolution cameras. The high resolution can refer to the pixel resolution, the spatial resolution, spectral resolution, temporal resolution and/or radiometric resolution. In one or more arrangements, the one or more cameras 36 can be high dynamic range (HDR) cameras, infrared (IR) cameras, or thermal imaging cameras.

In one or more arrangements, one or more of the cameras 36 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images. The one or more of the cameras 36 can be configured with zoom in and/or zoom out capabilities.

In one or more arrangements, one or more of the cameras 36 can be oriented, positioned, configured, operable, and/or arranged to capture visual data from at least a portion of the external environment 12 of the vehicle 10. In one or more arrangements, one or more cameras 36 can be oriented, positioned, configured, operable, and/or arranged to capture visual data from at least a rearward portion of the external environment of the vehicle 10. As a further example, at least one camera 36 can be oriented, positioned, configured, operable, and/or arranged to acquire visual data from at least a left side portion 16a and/or a right side portion 16b of the external environment of the vehicle 10. In such case, at least one camera 36 can be oriented, positioned, configured, operable, and/or arranged to acquire visual data from at least a left side portion 16a and/or a right side portion 16b of the external environment 12 of the vehicle 10.

In one or more arrangements, the one or more cameras 36 can be one or more backup cameras. "Backup camera" is a camera configured to acquire visual data of a rearward portion of the external environment of the vehicle. In some arrangements, the one or more backup cameras can have two or more application states. For example, the backup camera can have a backup application state and a detection application state. In the backup application state, the one or more backup cameras can capture visual data of at least a portion of the rearward portion of the external environment when the vehicle 10 is in a reverse gear mode and/or is otherwise moving in reverse. In the detection application state, the one or more the backup camera can capture visual data of at least a portion of the rearward portion of the external environment when the vehicle is not in a reverse gear mode and/or is otherwise moving in reverse. In detection application state, the backup camera can acquire visual data of the one or more person(s) approaching the vehicle 10 from a rearward portion of the external environment 12.

Alternatively or in addition, the one or more cameras 36 can be include other cameras that may be used in the vehicle 10. In one or more arrangements, the other cameras may have two or more application states, similar to the backup camera(s) described above.

The one or more cameras 36 can be located in any suitable portion of the vehicle 10. For instance, one or more of the cameras 36 can be located within the vehicle 10. One or more of the cameras 36 can be located on the exterior of the vehicle 10. One or more of the cameras 36 can be located on or exposed to the exterior of the vehicle 10. As an example, the one or more cameras 36 can be located in on a side of the vehicle 10. As another example, one or more cameras 36 can be located on the roof of the vehicle 10.

The position of one or more of the cameras 36 can be fixed such that its position does not change relative to the vehicle 10. One or more of the cameras 36 can be movable so that its position can change to allow visual data from different portions of the external environment 12 of the vehicle 10 to be captured. The movement of the cameras 36 can be achieved in any suitable manner. For instance, the cameras 36 can be rotatable about one or more axes, pivotable, slidable, and/or extendable, just to name a few possibilities. In one or more arrangements, the cameras 36 can have any suitable range of motion, including, for example, substantially spherical, substantially hemi-spherical, substantially circular and/or substantially linear. As used herein, the term "substantially" includes exactly the term it modifies and slight variations therefrom. Thus, for example, the term "substantially spherical" means exactly spherical and slight variations therefrom. The one or more cameras and/or the movement of the one or more cameras can be controlled by the processor(s) 24 and/or any one or more of the modules described herein or other module.

In one or more arrangements, the sensor system 14 can include one or more radar sensors 28. "Radar sensor" means any device, component and/or system that can detect, determine, assess, monitor, measure, quantify and/or sense something using at least in part radio signals. The one or more radar sensors 28 can be configured to detect, determine, assess, monitor, measure, quantify and/or sense, directly or indirectly, the presence of one or more objects in the external environment 12 of the vehicle 10, the position of each detected object relative to the vehicle 10, the distance between each detected object and the vehicle 10 in one or more directions (e.g. in the longitudinal direction $\alpha$, the lateral direction $\beta$ and/or other direction(s)), the elevation of each detected object, the speed of each detected object, and/or the movement of each detected object. The one or more radar sensors 28, or data obtained thereby, can determine or be used to determine the speed of objects in the external environment of the vehicle 10. The one or more radar sensors 28 can have three dimensional coordinate data associated with it the objects.

In one or more arrangements, the sensor system 14 can include one or more LIDAR sensors 30. "LIDAR sensor" means any device, component and/or system that can detect, determine, assess, monitor, measure, quantify and/or sense something using at least in part lasers. The LIDAR sensor can include a laser source and/or laser scanner configured to emit a laser signal and a detector configured to detect reflections of the laser signal. The LIDAR sensor may be configured to operate in a coherent or an incoherent detection mode.

The one or more LIDAR sensors 30 can be configured to detect, determine, assess, monitor, measure, quantify and/or sense, directly or indirectly, the presence of one or more objects in the external environment of the vehicle 10, the position of each detected object relative to the vehicle 10, the distance between each detected object and the vehicle 10 in one or more directions, the elevation of each detected object, the speed of each detected object, and/or the movement of each detected object.

In one or more arrangements, the sensor system 14 can include one or more motion sensors 32. "Motion sensor" means any device, component and/or system that can detect, determine, assess, monitor, and/or sense the movement of an object within a detection range of the sensor. The motion sensors 32 can use at least in part lasers, sound waves, radio waves, sonar, or any other type of signal, now known or later developed, used to generally detect motion. The one or more motion sensors 32 can be configured to monitor the external environment 12 of the vehicle 10. In one or more arrangements, the sensor system 14 can be active responsive to the motion sensors 32 detecting motion in a portion of the external environment 12 of the vehicle 10.

In one or more arrangements, the sensor system 14 can include one or more positioning sensors 34. "Positioning sensor" means one or more mechanisms, devices, elements, components, systems, applications and/or combinations thereof, now known or later developed, configured to determine the geographic location of the vehicle.

The positioning sensors 34 can include a global positioning system, a local positioning system, and/or a geolocation system. The positioning sensors 34 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the positioning sensors 34 can use Transmission Control Protocol (TCP) and/or a Geographic information system (GIS) and location services.

The positioning sensors 34 may include a transceiver configured to estimate a position of the vehicle 10 with respect to the Earth. For example, positioning sensors 34 can include a GPS transceiver to determine the vehicle's latitude, longitude and/or altitude. The positioning sensors 34 can use other systems (e.g. laser-based localization systems, inertial-aided GPS, and/or camera-based localization) to determine the location of the vehicle 10.

Alternatively or in addition, the positioning sensors 34 can be based on access point geolocation services, such as using the W3C Geolocation Application Programming Interface (API). With such a system, the location of the vehicle 10 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 10 is determined will depend on the manner of operation of the particular location tracking system used.

In one or more arrangements, the sensor system 14 can include a mobile device detector 38. "Mobile device detector" means any device, component, and/or system configured to detect the presence of a mobile device in proximity to the vehicle. The mobile device detector 38 can detect the mobile device in any suitable manner. For instance, the mobile device detector 38 can detect the mobile device by establishing or becoming communicatively linked with a mobile device. As used herein, the term "communicatively linked" can include direct or indirect connections through a communication channel or pathway or another component or system designed to transmit and/or receive information from one source to another.

For instance, the mobile device detector 38 and a mobile device can be communicatively linked by one or more wireless networks, whether short or long range. For example, in terms of short range wireless networks, the mobile device detector 38 and a mobile device can be communicatively linked by a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the mobile device detector 38 and a mobile device can be communicatively linked by a mobile, cellular, and or satellite-based wireless network. Examples of long range wireless networks can include GSM, TDMA, CDMA, WCDMA networks or the like. The mobile device detector 38 and a mobile device can be communicatively linked by any combination of the above networks and/or other types of networks. In some arrangements, the mobile device detector 38 can be communicatively linked with a mobile device via radio, light, or any other suitable means for communication. The mobile device detector 38 and the mobile device can include and/or execute suitable communication software, which enables the mobile device detector 38 and the mobile device to communicate with each other.

In one or more arrangements, the mobile device detector 38 can also be configured to determine whether a detected mobile device is an authorized mobile device (e.g., a mobile device associated with the vehicle 10). Any suitable manner of verification of whether a mobile device is an authorized mobile device can be implemented. For instance, the mobile device detector 38 can require one or more forms of authentication credentials to be provided. The authentication credentials can include, for example, one or more passwords, one or more pass codes, one or more personal identification numbers (PINS), one or more unique identifiers, and combinations thereof, just to name a few possibilities.

The authentication credentials can be provided automatically by the mobile device. Alternatively or in addition, the mobile device detector 38 can query the mobile device to provide the authentication credentials. If suitable authentication is provided, communication between the mobile device and the mobile device detector 38 can continue. However, if suitable authentication is not provided, the mobile device detector 38 can be configured to ignore or filter the mobile device or the person with which it is associated.

In one or more arrangements, the sensor system 14 can include one or more microphones 40. "Microphone" includes any device(s), component(s), and/or system(s) configured to detect sound. The microphone(s) 40 can convert received sound waves into electrical signals. The one or more microphones 40 can be located in any suitable portion of the vehicle 10. For instance, one or more of the microphones 40 can be located within the vehicle 10. One or more of the microphones 40 can also be located on the exterior of the vehicle 10. One or more of the microphones 40 can be located on or exposed to the exterior of the vehicle 10.

Alternatively or in addition to any of the sensors described above, the sensor system 14 can include other types of sensors. The sensor system 14, the processor 24(s), and/or one or more other elements of the vehicle 10 can be configured to detect one or more persons 18 approaching the vehicle 10 and/or to acquire visual data including to the one or more persons.

The sensor system 14 can be configured to acquire visual data of a portion 16 of the external environment 12. The portion 16 can be, for example, a left side portion 16a, a right side portion 16b, a frontward portion, and a rearward portion. The external environment 12 can include one or more persons. In some instances, the person can be an owner, driver, and/or occupant of the vehicle 10. The person may have previously been an occupant of the vehicle 10. Alternatively, the person may have never been an occupant of the vehicle 10. In some instances, a person in the external environment may not be associated with the vehicle 10.

The vehicle 10 can include one or more adjustable vehicle components 60. The one or more adjustable vehicle components 60 can be adjustable across a plurality of settings. More particularly, the one or more adjustable vehicle components 60 can be physically adjustable across a plurality of settings. "Physically adjustable" means that the component can be selectively moved to different spatial locations, orientations, and/or positions in one or more directions. Each of the one or more adjustable vehicle components 60 can have a current setting.

Figure 3:
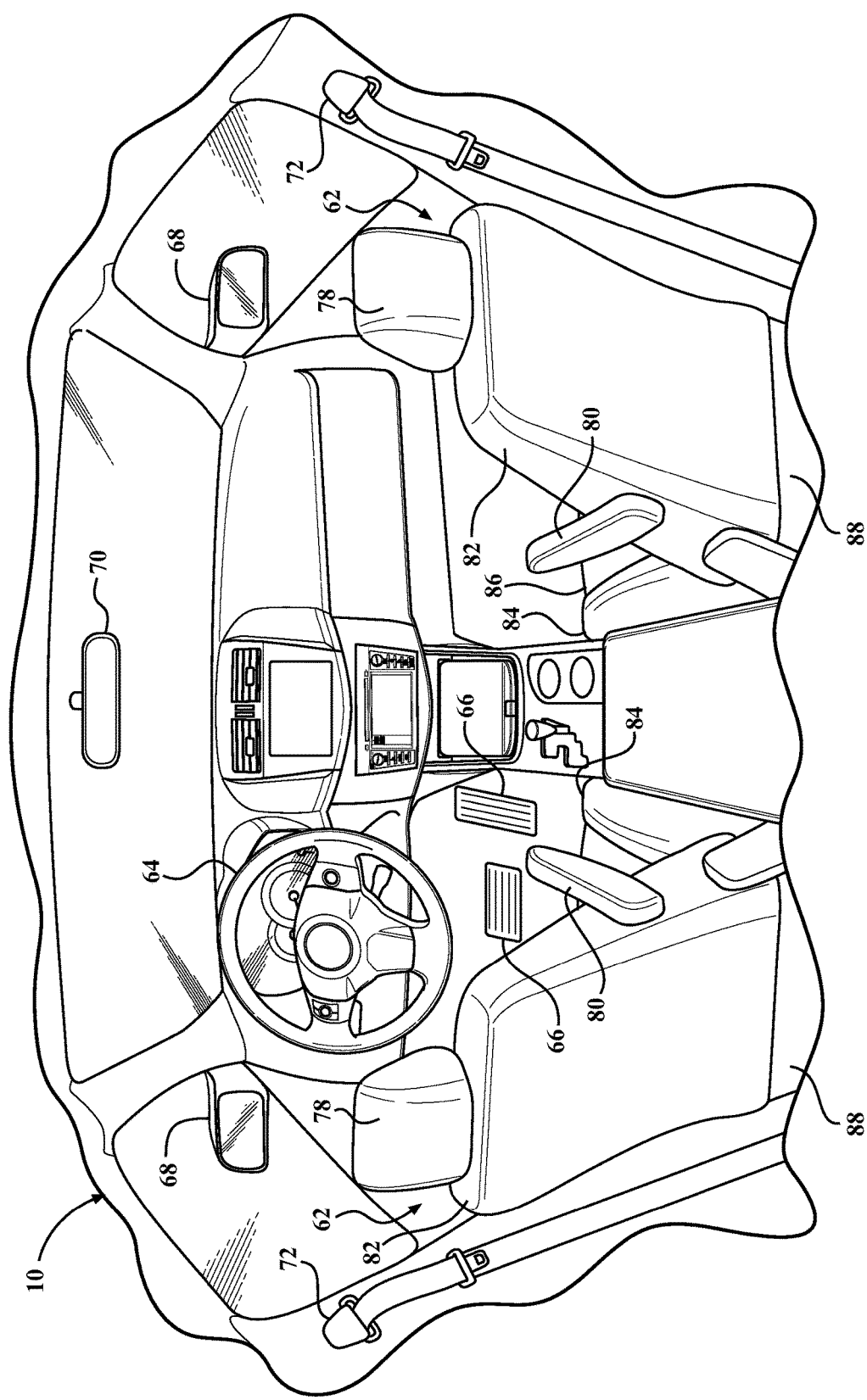
FIG. 3 is an example of an interior portion of a vehicle showing one or more adjustable components therein.

FIG. 3 is an example of an interior portion of the vehicle 10. Non-limiting examples of one or more adjustable vehicle components 60 are shown. For instance, the one or more adjustable vehicle components 60 can include one or more seats 62, a steering wheel 64, one or more pedals 66 (e.g., a brake pedal, a gas pedal, a footrest, and/or a clutch), one or more side view mirrors 68, a rear view mirror 70, or a seat belt anchor 72. The seat(s) 62 can include a headrest 78, an arm rest 80, a back rest 82, a cushion 84, one or more side bolster(s) 86, and a base 88. The one or more side bolster(s) can be positioned along the back rest and/or the cushion.

Returning to FIG. 2, the vehicle 10 can include one or more actuators 76. The actuators 76 can be any element or combination of elements operable to modify, adjust and/or alter one or more settings of the adjustable vehicle components 60. The actuators 76 can be activated responsive receiving signals or other inputs from one or more processors 24, one or more modules (e.g., a settings module 74), and/or a user input. Any suitable actuator can be used. For instance, the one or more actuators 76 can include motors, pneumatic actuators, hydraulic pistons, relays, solenoids, and/or piezoelectric actuators, just to name a few possibilities. In one or more arrangements, each of the adjustable vehicle components 60 can have a dedicated actuator 76. In one or more arrangements, one actuator 76 can be operatively connected to control one or more settings of two or more adjustable vehicle components 60.

The vehicle 10 can include one or more modules. The modules can be implemented as computer readable program code that, when executed by a processor, implement one or more of the various processes described herein. The modules can be a component of the processor(s) 24, or the modules can be executed on and/or distributed among other processing systems to which the processor(s) 24 are operatively connected. The modules can include instructions (e.g., program logic) executable by the processor(s) 24. Alternatively or in addition, the data store(s) 26 may contain such instructions. Various examples of modules that the vehicle 10 can include will be described herein.

Figure 5:
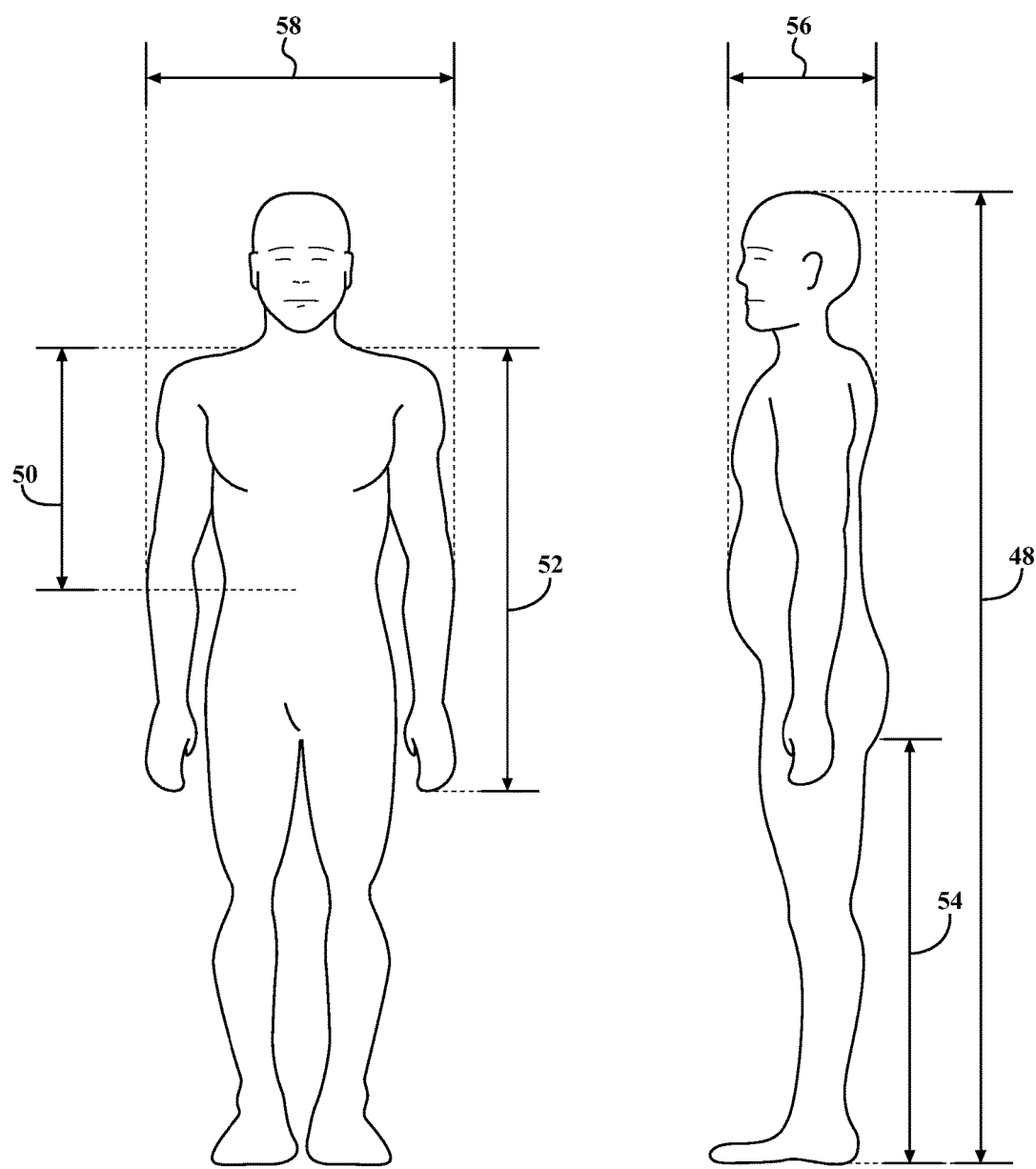
FIG. 5 shows examples of various anthropometric features of a person that can be measured.

The vehicle 10 can include an anthropometric module 46. The anthropometric module 46 can be configured to analyze visual data to measure at least one anthropometric feature of a person included in the visual data. "Anthropometric feature" means any measurement of a physical feature of a human being. An anthropometric feature may be indicative of the person's size. The anthropometric module 46 can measure various anthropometric features. Some examples of possible anthropometric features that can be measured by the anthropometric module 46 are shown in FIG. 5. Non-limiting examples of the anthropometric features can include an overall height 48, a torso height 50, an arm length 52, a leg length 54, a thickness 56, a width 58, and/or a girth.

The vehicle 10 can further include a settings module 74. The settings module 74 can be configured to determine one or more target settings for one or more of the adjustable vehicle components 60 based at least in part on a measured anthropometric feature of a person in the external environment 12 of the vehicle 10. In one or more arrangements, the settings module 74 can be configured to determine a target setting for one or more of the adjustable vehicle components 60 based solely on a measured anthropometric feature of a person in the external environment 12 of the vehicle 10. The one or more target settings can include one or more settings associated with one or more of the adjustable vehicle components 60. Non-limiting examples of target settings include a seat back angle, a seat slide position, a seat height, a steering wheel position, a steering wheel angle, a head rest height, a side view mirror position, a rear view mirror position, a seat belt anchor position, and/or a side bolster fill level.

Such a determination can be performed in any suitable manner. For instance, in one or more arrangements, the determination can be made by using the measured anthropometric feature in a predefined equation or algorithm to calculate a target setting. As another example, the measured anthropometric feature can be compared to predetermined values or predetermined ranges for an anthropometric feature. Each predetermined value or predetermined range can have a predetermined setting associated therewith. Thus, if a measured anthropometric feature is equal to a predetermined value or falls within a predetermined range, then the predetermined setting associated with such a value or range of values can be the target setting. The predetermined values and/or the predetermined range of values for an anthropometric feature can be stored in one or more of the data stores 26.

The settings module 74 can also be configured to compare the determined target setting of an adjustable vehicle component 60 to the current setting for the adjustable vehicle component 60. If the determined target setting is substantially equal to the current setting, the settings module 74 can be configured to maintain the current setting. Thus, no adjustment to the current setting of the adjustable vehicle component 60 is made. "Substantially equal" as used herein means equal and/or within a predetermined probability (e.g., about 5% or less, about 4% or less, about 3% or less, about 2% or less, about 1% or less, about 0.5% or less). Alternatively, if the determined target setting is not substantially equal to the current setting, the settings modules 74 can be configured to cause the current setting to match the determined target setting. Thus, settings module 74 can cause the current setting of an adjustable vehicle component 60 to be adjusted so that it matches the determined target setting. As used herein, "cause" or "causing" means to make, force, compel, direct, command, instruct, and/or enable an event or action to occur or at least be in a state where such event or action may occur, either in a direct or indirect manner. "Match" or "matches" means that the current setting and the target setting are substantially identical (e.g., exactly identical or within a predetermined probability (e.g., at least about 95%, at least about 96%, at least about 97% or greater) or confidence level. In one or more arrangements, the settings module 74 can cause the current setting to match the target setting of the one or more components prior to the person entering the vehicle 10.

For instance, the settings module 74 and/or the processor 24 can cause one or more actuators 76 to match the determined target setting. For instance, one or more actuators 76 can adjust and/or alter the position, location, and/or orientation of one or more adjustable vehicle component 60.

In one or more arrangements, the settings module 74 can determine whether a vehicle occupant makes any changes to the determined target settings upon entering the vehicle 10. The changes to the target settings can be recorded. For instance, the changes can be stored in one of more data stores 26. In some instances, the target settings can be adjusted made based on the user changes. In one or more arrangements, the adjusted target settings can be associated with the target settings and the measurements of the one or more anthropometric features stored in the data store(s) 26.

In one or more arrangements, the vehicle 10 can include a recall module 90. The recall module 90 can receive the measurements of the one or more anthropometric features from the anthropometric module 46. The recall module 90 can be configured to recall any adjustments made by the person to a determined target setting upon entering the vehicle 10. Thus, when the same or a similar measurement of an anthropometric features is obtained in the future, the adjustments can be applied to the target setting.

Acquiring visual data as described herein can be performed on any suitable basis. For instance, the acquiring of visual data can be performed continuously, periodically at any suitable interval, irregularly, or even randomly. However, in one or more arrangements, the vehicle 10 can be configured to acquire visual data in certain conditions. Various examples of some of the possible conditions will be described in connection with non-limiting examples of other modules below.

In one or more arrangements, the vehicle 10 can include an activation module 42. The activation module 42 can be configured to activate one or more modules, systems, components, or sensors of the vehicle responsive to the occurrence of a condition or an event. Examples of such a condition or event can include detecting a person in the external environment of the vehicle, detecting motion in the external environment of the vehicle, detecting a person approaching the vehicle, and/or detecting an authorized mobile device in the external environment of the vehicle. "Activate" or "activating" can include switching from a disabled state or standby state to an enabled state, switching from an "off" state to an "on" state, energizing, or switching from a low-energy state to a higher energy state or a fully active state. As an example, if motion is detected in the external environment of the vehicle 10 (e.g., by the motion sensor(s) 32), then the activation module 42 can activate the sensor system 14 (e.g., one or more of the cameras 36). In some arrangements, the activation module 42 can also deactivate one or more modules, systems, components, or sensors of the vehicle 10 if no persons are detected as approaching the vehicle within a predetermined period of time.

In one or more arrangements, the vehicle 10 can further include a pedestrian path assessment module 44. In one or more arrangements, the pedestrian path assessment module 44 may include any image processing software, now known or later developed. The pedestrian path assessment module 44 can be configured to determine a travel path of a person in the external environment 12 of the vehicle 10. For instance, the pedestrian path assessment module 44 can predict, estimate, and/or determine a future travel path 20a, 20b, 20c for a person 18a, 18b, 18c in the external environment 12, as is shown in FIG. 1. Such a determination can be made based on one or more factors including, for example, a current trajectory of the person, the orientation of the person's body relative to the vehicle, the speed of the person, and/or a history of the movement of the person, just to name a few possibilities. The determination of a future travel path can include any suitable extrapolation or prediction technique.

In some instances, the pedestrian path assessment module 44 can be configured to determine whether a determined future travel path is indicative of the person intending to enter the vehicle 10. Such a determination can be made in any suitable manner. For instance, the pedestrian path assessment module 44 can assess the determined future travel path relative to the current location of the vehicle 10 (e.g., a determined by the positioning sensor(s) 34) to determine whether the path is indicative of whether the person intends to enter the vehicle 10. If the determined future travel path intersects the vehicle 10 or passes within a predetermined distance from the vehicle 10, then it can be determined that the future travel path is indicative of the person intending on entering the vehicle 10. If the determined future travel path does not intersect the vehicle 10 or does not pass within a predetermined distance from the vehicle 10, then it can be determined that the future travel path is not indicative of the person intending on entering the vehicle 10. In one or more arrangements, the pedestrian path assessment module may further determine a likely position of the person 18 in the vehicle 10 (e.g., the driver's seat, front passenger seat, a rear seat, etc.

In one or more arrangements, the pedestrian path assessment module 44 can communicate whether the travel path 20 of the person is indicative of the person 18 entering the vehicle 10 to the activation module 42. Responsive to receiving a determination that the travel path of the person is indicative of the person entering the vehicle, the activation module 42 can activate one or more modules, systems, components, or sensors of the vehicle 10. Additionally, responsive to receiving a determination that the travel path of the person is not indicative of the person entering the vehicle, the activation module 42 can maintain the one or more modules, systems, components, or sensors of the vehicle 10 in a deactivated state, or it can deactivate one or more modules, systems, components, or sensors of the vehicle 10.

The vehicle 10 can include a sound analysis module 92. The sound analysis module 92 can be operatively connected to analyze audio data acquired by the one or more microphones 40. The sound analysis module 92 can be configured to classify audio data detected by the vehicle 10. For instance, the sound analysis module 92 can determine whether the detected audio data is indicative of the person approaching the vehicle 10 intends to enter the vehicle 10. For example, if the audio data is the sound of a lawn mower, then the sound analysis module 92 can determine that the sound data is not indicative of the person intending to enter the vehicle 10. As another example, if the audio data is the sound of a person handling his or her keys, then the sound analysis module 92 can determine that the audio data is indicative of the person intending to enter the vehicle 10.

In one or more arrangements, the sound analysis module 92 can communicate whether the detected audio data is indicative of the person approaching the vehicle 10 intends to enter the vehicle 10 to the activation module 42. Responsive to receiving a determination that the travel path of the person is not indicative of the person intending to enter the vehicle 10, the activation module 42 can maintain the one or more modules, systems, components, or sensors of the vehicle 10 in a deactivated state, or it can deactivate one or more modules, systems, components, or sensors of the vehicle 10. Responsive to receiving a determination that the audio data is indicative of the person entering the vehicle, the activation module 42 can activate one or more modules, systems, components, or sensors of the vehicle 10.

In one or more arrangements, the sound analysis module 92 can be operatively connected to the positioning sensor 34. The vehicle 10 can determine the location of a detected sound and/or the type of detected sound. Responsive to determining the location and type of sound, the vehicle 10 can selectively activate or deactivate the sensor system 14. For purposes of providing an example, if the vehicle 10 is at the owner's home, and the vehicle 10 detects the sound of a lawn mower, the vehicle 10 can maintain the sensor system 14 in a deactivated state responsive to the location of the vehicle 10 and the type of sound detected, and detecting the person approaching the vehicle 10, because the person is presumably cutting the lawn and does not wish to enter the vehicle 10.

In one or more arrangements, one or more of the modules 42, 44, 46, 74, 90, 92 described herein can include artificial or computational intelligence elements, e.g., neural network, fuzzy logic or other machine learning algorithms. Further, in one or more arrangements, one or more of the modules 42, 44, 46, 74, 90, 92 can be distributed among a plurality of the modules described herein. In one or more arrangements, two or more of the modules 42, 44, 46, 74, 90, 92 described herein can be combined into a single module.

Figure 4:
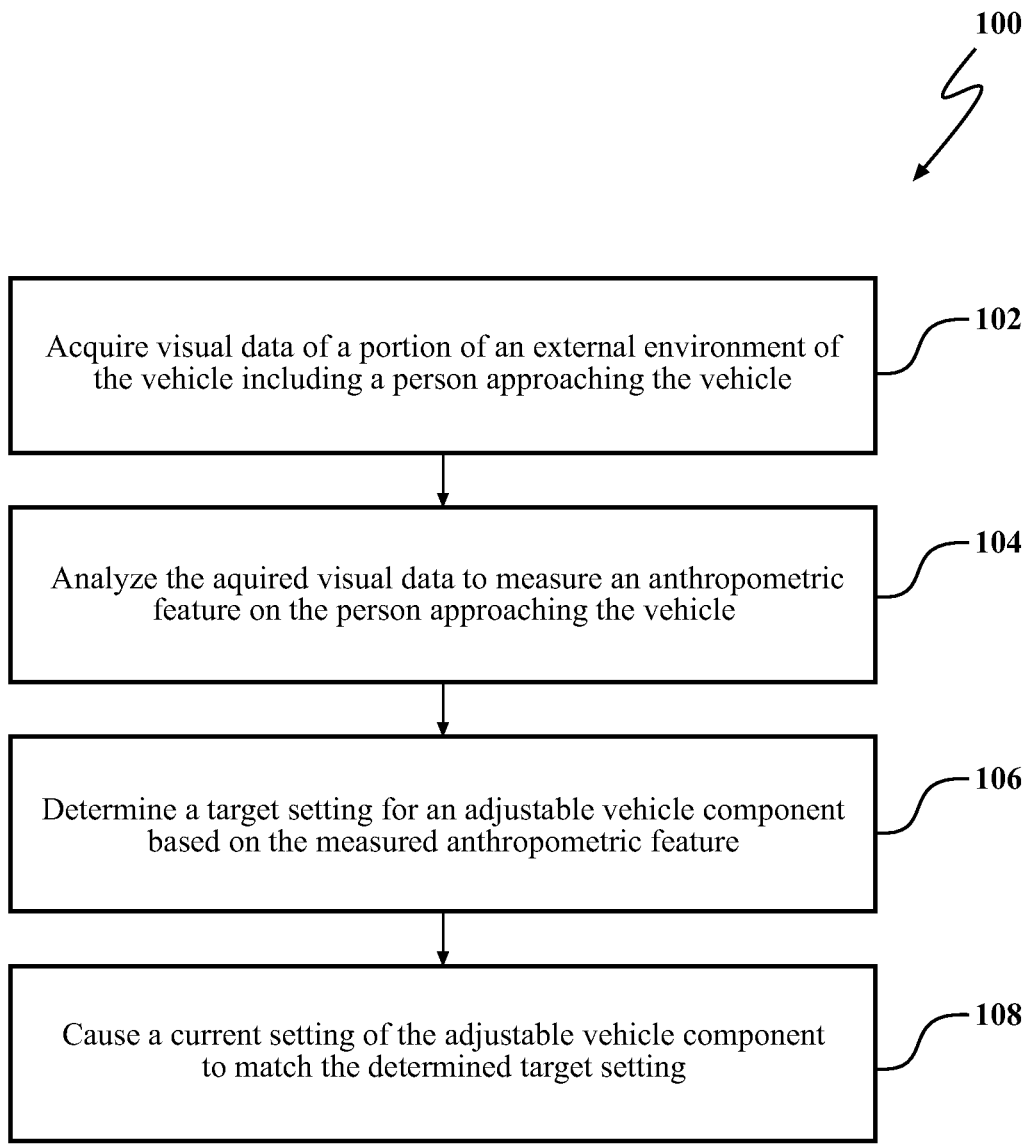
FIG. 4 is an example of a method for automatically providing a setting for one or more components of a vehicle.

Now that the various potential systems, devices, elements and/or components of the vehicle 10 have been described, various methods will now be described. Referring now to FIG. 4, an example of a method for automatically providing a setting for one or more adjustable vehicle components is shown. Various possible steps of method 100 will now be described. The method 100 illustrated in FIG. 4 may be applicable to the arrangements described above in relation to FIGS. 1-3 and 5, but it is understood that the method 100 can be carried out with other suitable systems and arrangements. Moreover, the method 100 may include other steps that are not shown here, and in fact, the method 100 is not limited to including every step shown in FIG. 4. The steps that are illustrated here as part of the method 100 are not limited to this particular chronological order. Indeed, some of the steps may be performed in a different order than what is shown and/or at least some of the steps shown can occur simultaneously.

At block 102, visual data of at least a portion 16 of at least a portion of an external environment 12 of the vehicle 10 can be acquired. The visual data can include one or more persons located in the external environment 12. For instance, the visual data can include a person approaching the vehicle 10.

The acquiring of the visual data can be performed continuously, periodically at any suitable interval, irregularly, or even randomly. In one or more arrangements, the acquiring can occur responsive to detecting a motion in at least a portion of the external environment 12 of the vehicle 10 and/or responsive to some other condition or event. The acquiring of the visual data can be performed by any suitable element or combination of elements of the vehicle 10. In one or more arrangements, the detecting can be performed by the sensor system 14 or one or more sensors thereof, such as, for example, one or more cameras 36. The method 400 can continue to block 104.

At block 104, the visual data can be analyzed. As an example, the analyzing can include detecting a person within the acquired visual data. As another example, the analysis can include determining whether the person is approaching the vehicle 10. The analysis can include measuring one or more anthropometric features of the person. The analyzing and/or measuring can be performed in any suitable manner, now known or later developed. The analyzing and/or measuring can be performed by any suitable element or combination of elements of the vehicle 10. In one or more arrangements, the analyzing and/or measuring can be performed by the sensor system 14 or one or more sensors thereof. Alternatively or in addition, in one or more arrangements, the analyzing and/or measuring can be performed, at least in part, by the anthropometric module 46 and/or one or more processors 24. The method can continue to block 106.

At block 106, a target setting for an adjustable vehicle component 60 can be determined. Such a determination can be based at least partially on the measured anthropometric feature. The determining can be performed in any suitable manner, now known or later developed. The determining can be performed by any suitable element or combination of elements of the vehicle 10. In some arrangements, a plurality of anthropometric features of the person can be measured. In such case, the determining of the target setting can be based on any one or more of the measured plurality of anthropometric features. In one or more arrangements, the analyzing and/or measuring can be performed by the sensor system 14 or one or more sensors thereof. In one or more arrangements, the determining can be performed, at least in part, by the settings module 74 and/or one or more processors 24. The method 100 can continue to block 108.

At block 108, a current setting of the component can be caused to match the determined target setting. For instance, the settings module 74 and/or one or more of the processors 24 can maintain or change the setting of one or more of the adjustable vehicle components 60. Such controlling can be performed directly or indirectly (e.g., by controlling one or more actuators 76). In one or more arrangements, causing the current setting of the component can be caused to match the determined target setting can be performed automatically.

In some instances, when the current setting of the vehicle component is different from the determined target setting, the vehicle component can be adjusted so that its current setting matches the determined target setting. It should be noted that, in some instances, the target setting may already match the current setting. In such instances, causing the current setting to match the determined target setting can include maintaining the current setting.

The method 100 can end. Alternatively, the method 100 can return to block 102. As a further alternative, the method 100 can include additional blocks (not shown). For instance, in one or more arrangements, the method 100 can further including determine a travel path of a person approaching the vehicle. The method 100 can include determining whether the travel path is indicative of the person intending to enter the vehicle. In one or more arrangements, when the travel path is determined as being indicative of the person intending to enter the vehicle, the method 100 can include activating the sensor system to acquire visual data of at least a portion of the external environment. In one or more arrangements, when the travel path is determined as being not being indicative of the person intending to enter the vehicle, the sensor system can remain in a deactivated or standby state.

Additionally or alternatively, the method 100 can include detecting a mobile device associated with a person approaching the vehicle. The method 100 can determine whether the mobile device is an authorized mobile device associated with the vehicle. In one or more arrangements, the method 100 can include activating the sensor system to acquire visual data of at least a portion of the external environment responsive to detecting an authorized mobile device. In one or more arrangements, the method 100 can include deactivating or not activating the sensor system to acquire visual data of at least a portion of the external environment responsive to determining that a detected mobile device is not authorized.

In one or more arrangements, the method 100 can further include determining a likely position of the person 18 responsive to determining the travel path 20 of the person 18 is indicative of the person 18 entering the vehicle 10. In this example, determining the setting can be determining the setting for the adjustable vehicle component 60 in the likely position in the vehicle 10. Additionally or alternatively, the method 100 can compare a current setting for the adjustable vehicle component 60 of the vehicle 10 to the target setting for the person 18. In one or more arrangements where the method 100 determines whether the mobile device 22 is an authorized mobile device, determining the target setting is performed responsive to determining that the mobile device 22 is an authorized mobile device.

The following example is provided for purposes of illustrating the overall system and methods provided herein. However, it should be understood that the present disclosure should not be limited to this example, and that many variations of this example are contemplated.

Referring to FIG. 1, there can be a plurality of persons 18*a*, 18*b*, 18*c* in the external environment 12 of the vehicle 10. The sensor system 14 can acquire visual data of the external environment 12. In this example, the vehicle 10 can capture visual data from the left side portion 16*a* and the right side portion 16*b* of the external environment 12. Such visual data can be acquired by for example, one or more cameras 36 of the vehicle 10. The visual data from the left side portion 16*a* of the external environment 12 can include persons 18*a*, 18*c*. The visual data from the right side portion 16*b* of the external environment 12 can include person 18*b*.

The acquired visual data can be analyzed. As an example, it can be determined whether the persons 18*a*, 18*b*, 18*c* in the acquired visual data are approaching the vehicle 10. For instance, the pedestrian path assessment module 44 can determine a future travel path 20*a*, 20*b*, 20*c* for each of the detected persons 18*a*, 18*b*, 18*c*. The pedestrian path assessment module 44 can determine whether one or more of the detected persons 18*a*, 18*b*, 18*c* is approaching the vehicle 10. In this example, the pedestrian path assessment module 44 can determine that the person 18*c* is not approaching the vehicle 10. As such, the person 18*c* can be filtered or ignored.

For the scenario presented in FIG. 1, the pedestrian path assessment module 44 can determine that the persons 18*a*, 18*b* are approaching the vehicle 10. In some instances, it can also be determined that whether the persons 18*a*, 18*b* likely intend to enter the vehicle 10. In some instances, the likely position of the persons 18*a*, 18*b* within the vehicle 10 can also be determined. For instance, it can be determined that the likely position of person 18*a* within the vehicle 10 is the driver's seat and that the likely position of person 18*b* is the front passenger seat. Such determinations can be useful is determining which of the seats within the vehicle 10 should be adjusted.

Additionally or alternatively, the vehicle 10 can detect whether the persons 18*a*, 18*b* approaching the vehicle 10 have a mobile device 22*a*, 22*b*. Such detection can be performed by, for example, the mobile device detector 38. It can be determined whether a detected mobile device 22*a*, 22*b* is an authorized mobile device. Accordingly, the vehicle 10 can determine whether the detected mobile devices 22*a*, 22*b* are an authorized mobile devices associated with the vehicle 10. In one or more arrangements, if a detected mobile device is not associated with the vehicle 10, then the person can be filtered or ignored.

The acquired visual data can be analyzed by the anthropometric module 46. For instance, the anthropometric module 46 can analyze the visual data of each person 18*a*, 18*b* approaching the vehicle 10 to measure one or more anthropometric features of each person. Any one or more anthropometric features can be measured. For purposes of this example, the overall height 48 of each person 18*a*, 18*b* can be measured.

Based on the measured overall height of each person 18*a*, 18*b*, a target setting for an adjustable vehicle component can be determined based on the measured anthropometric features (e.g., the overall height of the person). For instance, based on the overall height of each person 18*a*, 18*b*, a target setting for a vehicle seat can be determined.

A current setting of the adjustable vehicle component 60 can be caused to match the determined target setting. For instance, such causing can be performed by, for example, the settings module 74. For example, the target setting for the vehicle seat can be compared to the current setting of the vehicle seat. If the target setting and the current setting are substantially identical, then vehicle seat can be maintained in its current position. If the target setting and the current setting are not substantially identical, then the vehicle seat can be caused to match, such as by one or more actuators 76, the determined target setting. Such adjusting can be performed prior to the respective person 18a, 18b entering the vehicle 10.

It will be appreciated that arrangements described herein can provide numerous benefits, including one or more of the benefits mentioned herein. For example, arrangements described herein can improve the comfort of occupants of the vehicle. Arrangements described herein can facilitate the adjustment of one or more components of the vehicle prior to occupants entering the vehicle. Arrangements described herein do not require the exact identity of a person in the external environment to be determined. Arrangements described herein can minimize the amount of adjustments that an occupant has to make to one or more vehicle components upon entering the vehicle. In some instances, arrangements described herein can eliminate the need for a user to make any adjustments. Thus, arrangements described herein can provide convenience to an occupant.

As an example, when a seat is left in the forward most position and a tall driver attempts to enter the vehicle, he or she may be unable to or may have greater difficulty entering the vehicle without moving the seat backward. According to arrangements described herein, the seat can be automatically moved backward if a person approaching the vehicle is detected. Arrangements described herein do not require settings for an adjustable vehicle component to be pre-set by a user or other entity. Arrangements described herein can be operative irrespective to an occupant's prior association with the vehicle. For example, arrangements described herein can adjust one or more components of the vehicle for an occupant who has never been an occupant of the vehicle before.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A system for automatically providing a setting for one or more components of a vehicle comprising:
   one or more sensors configured to acquire sensor data of a portion of an external environment of the vehicle;
   one or more cameras configured to acquire visual data of a portion of an external environment of the vehicle, the visual data including a person approaching the vehicle;
   a component of the vehicle, the component being adjustable across a plurality of settings, the component having a current setting, wherein the component is one of: a seat, a steering wheel, a pedal, a head rest, a side view mirror, a rear view mirror, a seat belt anchor, or a side bolster; and
   one or more processors operatively connected to the one or more sensors, the one or more cameras, and the component, the one or more processors being programmed to initiate executable operations comprising:
      determining a future travel path of the person, the determining including extrapolating past positions of the person based on sensor data acquired by the one or more sensors;
      determining whether the future travel path is indicative of the person approaching the vehicle;
      responsive to determining the future travel path of the person is indicative of the person approaching the vehicle, analyzing visual data acquired by the one or more cameras to measure an anthropometric feature of the person approaching the vehicle, the anthropometric feature being a measurement of the person indicative of a size of the person;
      determining a target setting for the component based on the measured anthropometric feature, the target setting corresponding to the size of the person; and
      causing the current setting of the component to match the determined target setting, whereby the determined target setting improves the comfort of the person when seated in the vehicle.

2. A method of automatically providing a setting for one or more components of a vehicle comprising:
   detecting a mobile device;
   determining whether the mobile device is an authorized mobile device associated with the vehicle;
   determining a future travel path of a person carrying the mobile device, the determining including extrapolating past positions of the mobile device or of the person;
   determining whether the future travel path is indicative of the person approaching the vehicle;
   responsive to determining the mobile device is an authorized mobile device associated with the vehicle and to determining the future travel path of the person is indicative of the person approaching the vehicle, analyzing visual data acquired by one or more vehicle sensors of a portion of an external environment of the vehicle that includes the person to measure an anthropometric feature of the person approaching the vehicle;
   determining a target setting for a component of a vehicle based on the measured anthropometric feature; and
   causing a current setting of the component to match the determined target setting, whereby the determined target setting improves the comfort of the person when seated in the vehicle.

3. The system of claim 1, wherein the anthropometric feature is one of: an overall height, a torso height, an arm length, a leg length, a thickness, a girth, or a width.

4. The system of claim 1, wherein the executable operations further include:
   comparing the current setting to the determined target setting, and
   wherein, if the determined target setting is substantially equal to the current setting, causing the current setting of the component to match the determined target setting includes maintaining the current setting of the component.

5. The system of claim 1, further including an actuator operatively connected to the component, and wherein the executable operations further include:
   comparing the current setting to the determined target setting, and
   wherein, if the determined target setting is not substantially equal to the current setting, causing the current setting of the component to match the determined target setting includes causing the actuator to adjust the current setting of the component.

6. The system of claim 1, further including a mobile device detector, and wherein the executable operations further include:
   responsive to detecting a mobile device associated with a person approaching the vehicle, determining whether the mobile device is an authorized mobile device associated with the vehicle, and
   wherein analyzing the visual data acquired to measure an anthropometric feature of the person approaching the vehicle is performed responsive to determining that the mobile device is an authorized mobile device associated with the vehicle.

7. The system of claim 1, further including a motion detector, and wherein the executable operations further include:
   activating at least one of the one or more cameras or the one or more sensors responsive to the motion detector detecting motion in a portion of the external environment of the vehicle.

8. The system of claim 1, wherein the executable operations further include:
   responsive to determining the future travel path of the person is not indicative of the person entering the vehicle, maintaining the one or more sensors in a deactivated state.

9. The system of claim 1, further including:
   a microphone operatively connected to the one or more processors, wherein the microphone is configured to acquire data of a portion of the external environment of the vehicle, and wherein the executable operations further include:
      analyzing the data acquired by the microphone to detect a sound in the external environment of the vehicle;
      determining whether the detected sound is indicative of a person wanting to enter the vehicle or of a person not wanting to enter the vehicle; and
      responsive to determining that the detected sound is indicative of a person not wanting to enter the vehicle, maintaining the one or more sensors in a deactivated state.

10. The system of claim 1, wherein causing the current setting of the component to match the target setting determined is performed prior to the person entering the vehicle.

11. The system of claim 1, wherein determining whether the future travel path is indicative of the person approaching the vehicle is performed when the person is located within an activation range of the vehicle.

12. A method of automatically providing a setting for one or more components of a vehicle comprising:

determining a future travel path of a person approaching the vehicle, whereby the future travel path includes a subsequent travel path of the person;

determining whether the future travel path is indicative of the person entering the vehicle;

responsive to determining that the future travel path of the person is indicative of the person entering the vehicle, analyzing visual data acquired by one or more vehicle sensors of a portion of an external environment of the vehicle that includes the person to measure an anthropometric feature of the person approaching the vehicle, the measured anthropometric feature being a distance;

determining a target setting for a component of a vehicle based on the measured anthropometric feature, the component being adjustable across a plurality of settings, the component having a current setting, the target setting directly corresponding to the distance, and the component being one of a seat, a steering wheel, a pedal, a head rest, a side view mirror, a rear view mirror, a seat belt anchor, or a side bolster; and causing the current setting of the component to match the determined target setting, whereby the determined target setting improves the comfort of the person when seated in the vehicle.

13. The method of claim 12, further including:

sensing a portion of an external environment of the vehicle to detect motion therein, wherein acquiring visual data of a portion of the external environment of the vehicle is performed responsive to detecting motion in the portion of the external environment of the vehicle.

14. The method of claim 12, wherein visual data acquired by one or more vehicle sensors of a portion of the external environment of the vehicle that includes the person is not acquired responsive to determining that the future travel path of the person is not indicative of the person entering the vehicle.

15. The method of claim 14, further including:

determining a likely position of the person within the vehicle responsive to determining that the future travel path of the person is indicative of the person entering the vehicle.

16. The method of claim 15, wherein determining the target setting for the component of the vehicle includes determining the target setting for the component that is located at or near the determined likely position of the person within the vehicle.

17. The method of claim 12, further including:

comparing the current setting to the determined target setting, wherein, if the determined target setting is substantially equal to the current setting of the component, causing the current setting of the component to match the determined target setting includes maintaining the current setting of the component.

18. The method of claim 12, further including:

comparing the current setting to the determined target setting, wherein, if the determined target setting is not substantially equal to the current setting of the component, causing the current setting of the component to match the determined target setting includes adjusting the current setting of the component.

19. The method of claim 12, further including:

detecting a mobile device associated with the person approaching the vehicle; and determining whether the mobile device is an authorized mobile device associated with the vehicle, wherein determining the target setting for the component of the vehicle based on the measured anthropometric feature is performed responsive to determining that the mobile device is an authorized mobile device associated with the vehicle.

20. The system of claim 1, wherein determining whether the future travel path is indicative of the person approaching the vehicle includes determining whether the future travel path of the person intersects the vehicle or passes within a predetermined distance from the vehicle.

21. The system of claim 1, wherein the anthropometric feature is a distance on the person.

* * * * *